United States Patent
Kakkad et al.

(10) Patent No.: US 10,606,739 B2
(45) Date of Patent: Mar. 31, 2020

(54) AUTOMATED PROGRAM CODE ANALYSIS AND REPORTING

(71) Applicant: Accenture Global Solutions Limited, Dublin (IE)

(72) Inventors: Hemant Kakkad, Mumbai (IN); Nitin Kumar Gupta, Ghaziabad (IN); Richa Gupta, Pune (IN); Shiv Gohn Giri, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 47 days.

(21) Appl. No.: 15/913,630

(22) Filed: Mar. 6, 2018

(65) Prior Publication Data
US 2018/0275989 A1    Sep. 27, 2018

(30) Foreign Application Priority Data

Mar. 21, 2017  (IN) .............................. 201741009848

(51) Int. Cl.
| | | |
|---|---|---|
| G06F 9/44 | (2018.01) | |
| G06F 11/36 | (2006.01) | |
| G06F 8/77 | (2018.01) | |
| G06F 11/34 | (2006.01) | |

(52) U.S. Cl.
CPC ............ *G06F 11/3688* (2013.01); *G06F 8/77* (2013.01); *G06F 11/3409* (2013.01); *G06F 11/3684* (2013.01); *G06F 11/3692* (2013.01)

(58) Field of Classification Search
CPC .... G06F 9/454; G06F 11/3688; G06F 16/258; G06F 11/3616; G06F 11/3409; G06F 11/3692; G06Q 10/06; G06Q 10/10
See application file for complete search history.

(56) References Cited

U.S. PATENT DOCUMENTS

| | | | |
|---|---|---|---|
| 6,934,934 B1 | 8/2005 | Osborne, II et al. | |
| 7,203,926 B2 | 4/2007 | Bogle et al. | |
| 9,110,770 B1 | 8/2015 | Raju et al. | |
| 9,135,147 B2 | 9/2015 | Artzi et al. | |
| 9,213,625 B1 * | 12/2015 | Schrage | G06F 11/3688 |
| 2006/0059253 A1 * | 3/2006 | Goodman | G06Q 10/10 709/223 |

(Continued)

FOREIGN PATENT DOCUMENTS

WO    2012/088173    6/2012

OTHER PUBLICATIONS

Extended European Search Report corresponding to EP 18 16 2500, dated Jun. 16, 2018, 14 pages.

*Primary Examiner* — Tuan A Vu
(74) *Attorney, Agent, or Firm* — Harrity & Harrity, LLP

(57) ABSTRACT

A device may receive information identifying a development project. The device may determine a set of scripts to assess program code of the development project. The device may execute the set of scripts to perform a project assessment of the development project after determining the set of scripts. The device may generate a user interface including information identifying a result of executing the set of scripts. The result may include information associated with detecting an execution type of error or information associated with detecting a non-execution type of error. The device may communicate with a client device to provide the user interface for display via the client device.

20 Claims, 5 Drawing Sheets

(56) References Cited

U.S. PATENT DOCUMENTS

| | | | |
|---|---|---|---|
| 2006/0235732 A1* | 10/2006 | Miller | G06Q 10/06 |
| | | | 705/7.23 |
| 2009/0144698 A1 | 6/2009 | Fanning et al. | |
| 2011/0055799 A1* | 3/2011 | Kaulgud | G06F 11/3616 |
| | | | 717/101 |
| 2014/0053138 A1 | 2/2014 | Yassin et al. | |
| 2014/0109061 A1 | 4/2014 | Gibbens et al. | |
| 2015/0082277 A1* | 3/2015 | Champlin-Scharff | ........................ |
| | | | G06F 9/454 |
| | | | 717/120 |
| 2015/0100832 A1* | 4/2015 | Nanjundappa | G06F 11/3688 |
| | | | 714/38.14 |
| 2015/0134589 A1* | 5/2015 | Marrelli | G06F 16/258 |
| | | | 707/602 |

\* cited by examiner

AUTOMATED PROGRAM CODE ANALYSIS AND REPORTING

RELATED APPLICATION

This application claims priority under 35 U.S.C. § 119 to Indian Patent Application No. 201741009848, filed on Mar. 21, 2017, the content of which is incorporated by reference herein in its entirety.

BACKGROUND

A development project may include developing program code to perform a set of functions. A client may engage a group of developers to complete the development project. The development project may be associated with a set of requirements that are to be fulfilled by the program code developed for the development project. For example, to satisfy a set of accessibility requirements, the program code may include a text-to-speech functionality (e.g., to enable a visually impaired user to use an application or website that includes the program code). Upon completion of developing the program code, another group of developers may review the program code to ensure that the program code satisfies the set of requirements. The client may determine that the development project is complete based on the other group of developers ensuring that the program code satisfies the set of requirements.

SUMMARY

According to some possible implementations, a device may include one or more processors. The one or more processors may receive information identifying a development project. The one or more processors may process the information identifying the development project to determine a set of scripts to assess program code of the development project. The set of scripts may include a first script to detect an execution type of error. The set of scripts may include a second script to detect a non-execution type of error. The one or more processors may configure the set of scripts after determining the set of scripts. The one or more processors may communicate with a client device to monitor the development project and to periodically execute the set of scripts to perform a project assessment of the development project. The one or more processors may communicate with the client device to provide information identifying results of the project assessment based on communicating with the client device to monitor the development project and to periodically execute the set of scripts. The results may include information associated with detecting the execution type of error or information associated with detecting the non-execution type of error.

According to some possible implementations, a method may include determining, by a device, a set of scripts for a project assessment of program code of a development project. The method may include configuring, by the device, the set of scripts for execution to perform the project assessment of the program code of the development project based on determining the set of scripts. The method may include monitoring, by the device, the development project. The method may include determining, by the device, to execute one or more scripts, of the set of scripts, to perform the project assessment of the program code of the development project based on monitoring the development project. The method may include determining, by the device, a set of results of the project assessment based on executing the one or more scripts. The method may include generating, by the device, a set of recommendations relating to the development project based on the set of results of the project assessment. The method may include generating, by the device, a set of recommendations relating to the development project based on the set of results of the project assessment.

According to some possible implementations, a non-transitory computer-readable medium may store one or more instructions that, when executed by one or more processors, may cause the one or more processors to receive information identifying a development project. The one or more instructions, when executed by the one or more processors, may cause the one or more processors to determine a set of scripts to assess program code of the development project. The one or more instructions, when executed by the one or more processors, may cause the one or more processors to execute the set of scripts to perform a project assessment of the development project after determining the set of scripts. The one or more instructions, when executed by the one or more processors, may cause the one or more processors to generate a user interface including information identifying a result of executing the set of scripts. The result may include information associated with detecting an execution type of error or information associated with detecting a non-execution type of error. The one or more instructions, when executed by the one or more processors, may cause the one or more processors to communicate with a client device to provide the user interface for display via the client device.

DETAILED DESCRIPTION

The following detailed description of example implementations refers to the accompanying drawings. The same reference numbers in different drawings may identify the same or similar elements.

A development project may be completed for a client based on a set of requirements provided by the client. After completion of determining program code for the development project, a developer may review the program code to ensure compliance with the set of requirements. Based on ensuring compliance with the set of requirements, the client may determine that the development project is completed, and may publish the program code. For example, based on completing the development project, the program code may be published to provide a new website, to update an existing website, to provide a new application, to update an existing application, or the like. However, determining compliance with a set of requirements may be costly, time consuming, and inaccurate. For example, a client may include a requirement relating to accessibility, such as a requirement that a website be configured to be used by a sight-impaired user, which may require a developer may develop code associated with a text-to-speech functionality. However, execution based testing of the website may fail to reveal that the text-to-speech functionality is not included in program code of the website, as the program code may successfully execute despite the text-to-speech functionality not being included.

Implementations, described herein, may automatically perform unit testing and program code review to generate an assessment of a development project. Based on performing unit testing and program code review, implementations, described herein, may automatically generate and implement a recommendation relating to program code quality. Similarly, implementations described herein may automatically generate and provide a certification relating to satisfaction of a set of requirements. In this way, developer effort may be reduced relative to performing a manual review of program code. Moreover, based on utilizing a set of standardized scripts and/or automatically customized scripts to perform program code review, a likelihood of errors is reduced relative to manual program code review, thus reducing a utilization of processing resources relative to publishing error filled and/or incomplete program code and being required to subsequently correct errors and incomplete portions of the program code. Furthermore, based on automatically testing for satisfaction of standards and/or guidelines relating to the program code, a client, such as a government agency or another organization, may determine that the program code satisfies the standards and/or guidelines, thereby reducing an amount of time required to certify the development project as complete and publish the program code as a website, an application, or the like.

Figure 1A:
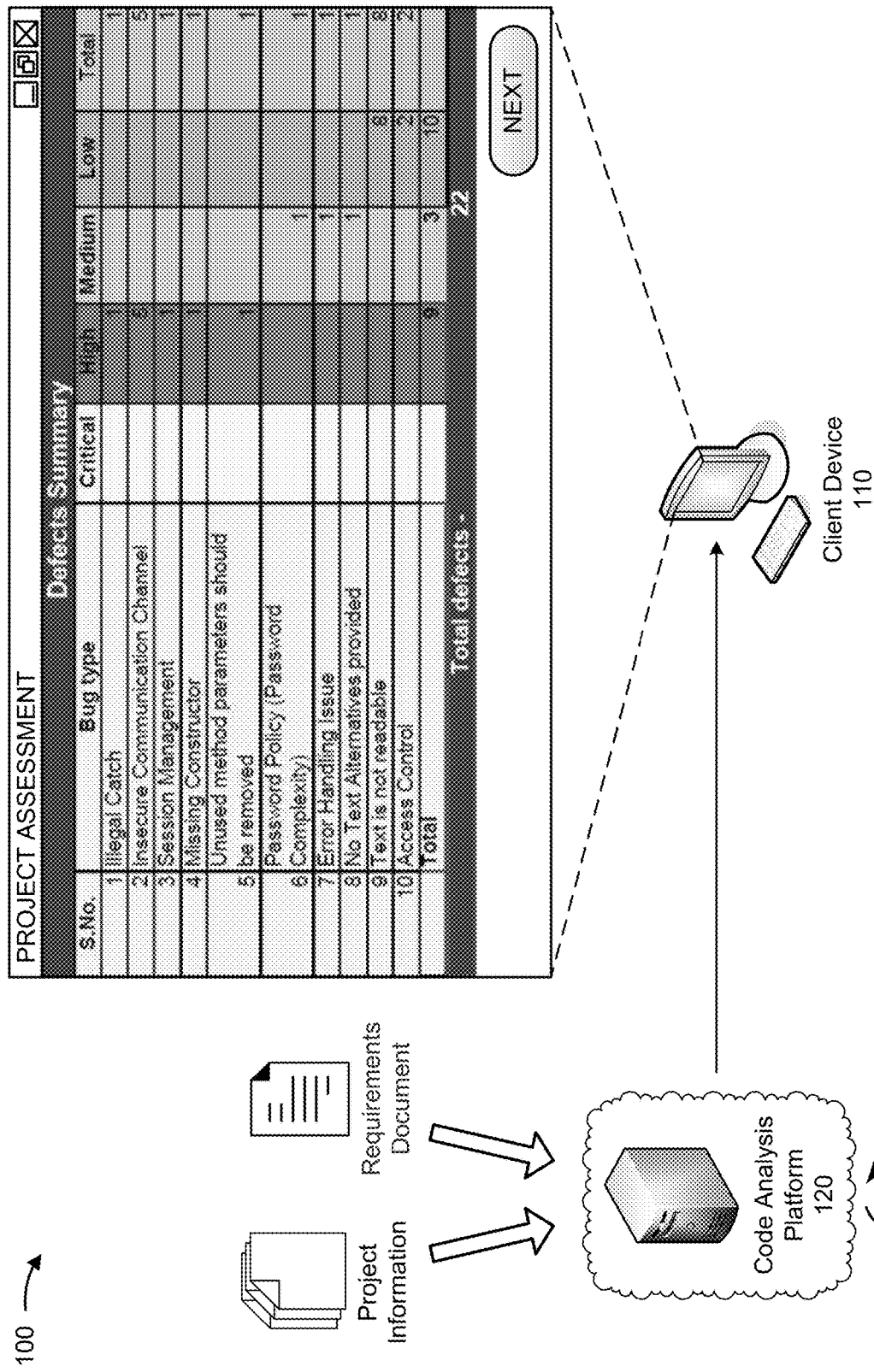
FIGS. 1A and 1B are diagrams of an overview of an example implementation described herein.
Figure 1B:
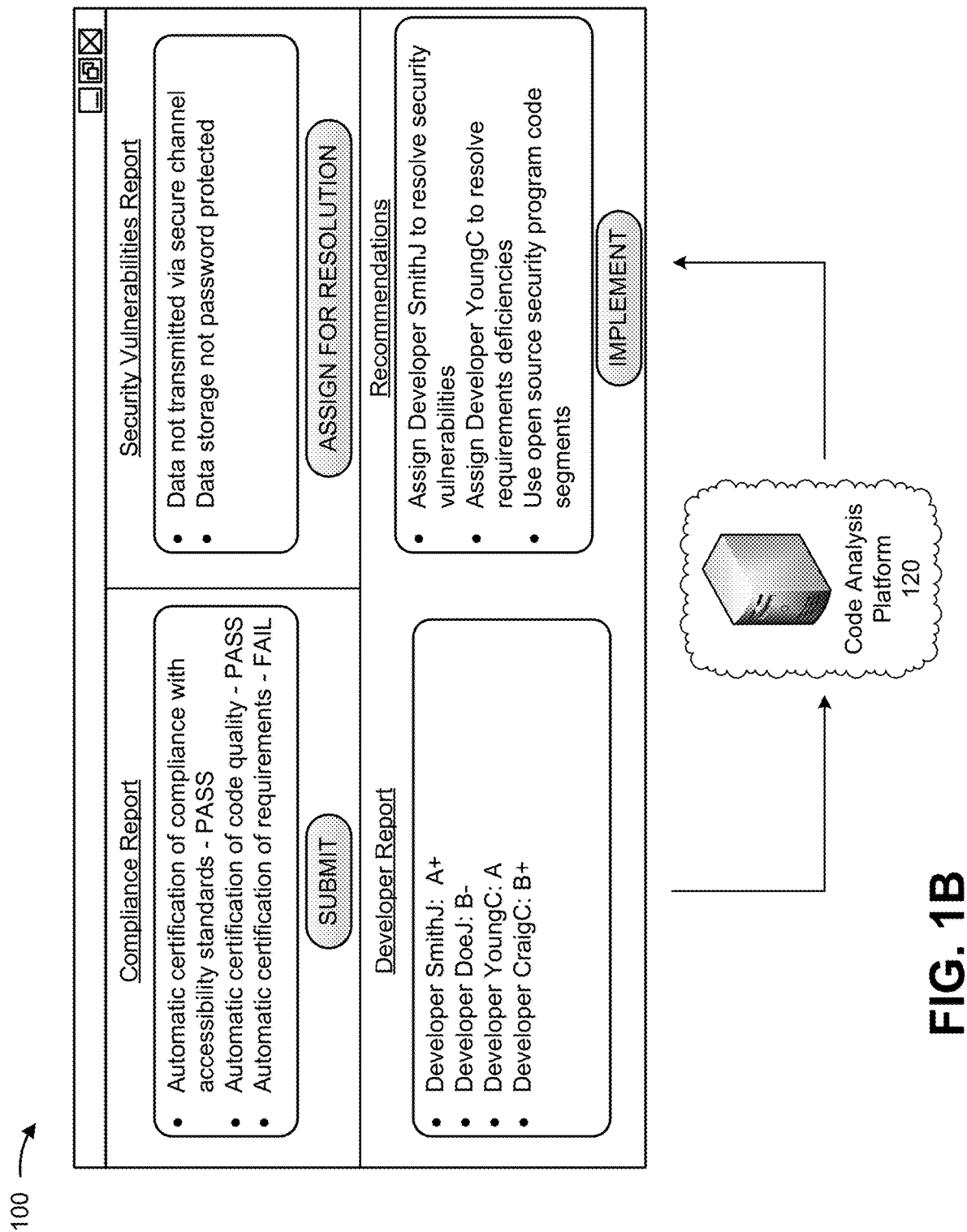

FIGS. 1A and 1B are diagrams of an overview of an example implementation 100 described herein. As shown in FIG. 1A, example implementation 100 includes a client device 110 and a code analysis platform 120 operating in a cloud computing environment.

As further shown in FIG. 1A, code analysis platform 120 may obtain project information regarding a development project and a requirements document regarding a set of requirements for the development project. For example, code analysis platform 120 may obtain program code generated for the development project, a set of requirements relating to the program code, or the like. Requirements may include execution based requirements, such as a requirement relating to errors that occur when the program code is executed, non-execution based requirements, such as requirements relating to errors that do not occur when the program code is executed (e.g., an accessibility requirement for text-to-speech functionality relating to ensuring that the program code is compliant with a set of disabled persons accessibility standards), or the like. In some implementations, code analysis platform 120 may communicate with one or more other devices (not shown) to obtain the project information and/or the requirements document. For example, code analysis platform 120 may utilize a natural language processing technique to parse a published law regarding accessibility accommodations for disabled persons, and may determine a set of requirements that is to be satisfied by the development project based on parsing the published law. Similarly, code analysis platform 120 may parse a published law regarding data retention, data security, or the like, and may generate a set of requirements to ensure compliance with the published law. For example, code analysis platform 120 may determine that a set of data protection rules (e.g., relating to data security for user data input into one or more fields of a website) is included in a regulation, and may generate a set of requirements for validation of data security for user input of data based on the set of data protection rules.

As further shown in FIG. 1A, code analysis platform 120 may perform a project assessment using stored scripts. For example, code analysis platform 120 may select a set of scripts from a repository of scripts, and may automatically execute the set of scripts to analyze the program code. In some implementations, code analysis platform 120 may select the set of scripts based on an initial analysis of the program code. For example, code analysis platform 120 may parse the program code to identify a particular set of portions of the program code, such as a set of open source portions included in the program code, a set of previously used portions of the program code, or the like, and may select one or more scripts that have been previously used to analyze the particular set of portions of the program code. In this way, code analysis platform 120 reduces a utilization of computing resources relative to generating new scripts for each development project.

As further shown in FIG. 1A, code analysis platform 120 may provide results of the project assessment to client device 110 for display. For example, code analysis platform 120 may provide information identifying a set of defects (e.g., a set of bugs, such as an illegal catch bug, an insecure communication channel bug, a session management bug, etc.), a categorization of the set of defects (e.g., a severity categorization, such as a critical severity, a high severity, a medium severity, etc.), or the like. In some implementations, code analysis platform 120 may provide the results to a client device 110 utilized by a developer of the development project. For example, based on detecting an error determined to be of a threshold level of severity, code analysis platform 120 may provide the project assessment to the developer to indicate that resolution of the error is to be performed before the development project is complete. Additionally, or alternatively, based on determining the project does not include errors or includes errors determined not to satisfy the threshold level of severity, code analysis platform 120 may provide the project assessment to a client device 110 used by a client that assigned the development project. In this way, code analysis platform 120 may provide information to the client associated with verifying that the set of requirements are satisfied by program code of the development project.

As shown in FIG. 1B, code analysis platform 120 may generate, and provide for display via client device 110, other information relating to the project assessment. For example, code analysis platform 120 may generate a compliance report. In this case, code analysis platform 120 may identify non-compliant portions of code, may certify compliant portions of code for use in verifying that a set of requirements is satisfied, may generate one or more certifications relating to the development project for use in determining whether the development project is complete, or the like. Additionally, or alternatively, code analysis platform 120 may generate a security vulnerabilities report. In this case, code analysis platform 120 may identify portions of code that are associated with a security vulnerability to malicious software based on determining that the portions of code correspond to known malicious exploits (e.g., system identification vulnerabilities, password vulnerabilities, access permission vulnerabilities, logging vulnerabilities, root vulnerabilities, user account vulnerabilities, file system security vulnerabilities, file transport protocol (FTP) vulnerabilities, etc.). Similarly, code analysis platform 120 may identify security standards not satisfied by the program code, such as data transmission security standards, data storage security standards, or the like.

Additionally, or alternatively, code analysis platform 120 may generate a developer report. For example, code analysis platform 120 may periodically provide information identifying developers that have published program code that does not satisfy a set of program code standards. Moreover, code analysis platform 120 may provide information identifying work quality on a developer basis (e.g., a rating of portions of code authored by a particular developer of a group of developers). Additionally, or alternatively, code analysis platform 120 may generate a set of recommendations. In this case, code analysis platform 120 may provide information identifying a set of recommended corrective actions to improve program code quality, improve program code compliance, reduce security vulnerability, improve developer productivity, or the like. Based on user interaction with a button, code analysis platform 120 may provide a generated report to a relevant stakeholder (e.g., a client, a manager, a developer, etc.), and/or may submit milestone information to a client billing system (e.g., information identifying satisfaction of a set of requirements) to automatically initiate billing for the development project. Additionally, or alternatively, code analysis platform 120 may automatically assign tasks to a developer, generate program code based on stored program code segments (e.g., automatically add an open source user authentication program code segment to resolve a security vulnerability relating to permitting users to access the development project without authentication), or the like.

In this way, code analysis platform 120 automatically determines that a set of project milestones is satisfied, thereby reducing a utilization of computing resources and network resources associated with verifying compliance with a set of requirements and initiating billing relative to a developer being required to manually inspect code and submit a report to cause billing to be initiated for the development project. Moreover, code analysis platform 120 provides information to improve code quality, thereby reducing a utilization of computing resources relating to subsequent revisions of error-prone and/or vulnerable applications or websites using program code of the development project.

As indicated above, FIGS. 1A and 1B are provided merely as an example. Other examples are possible and may differ from what was described with regard to FIGS. 1A and 1B.

Figure 2:
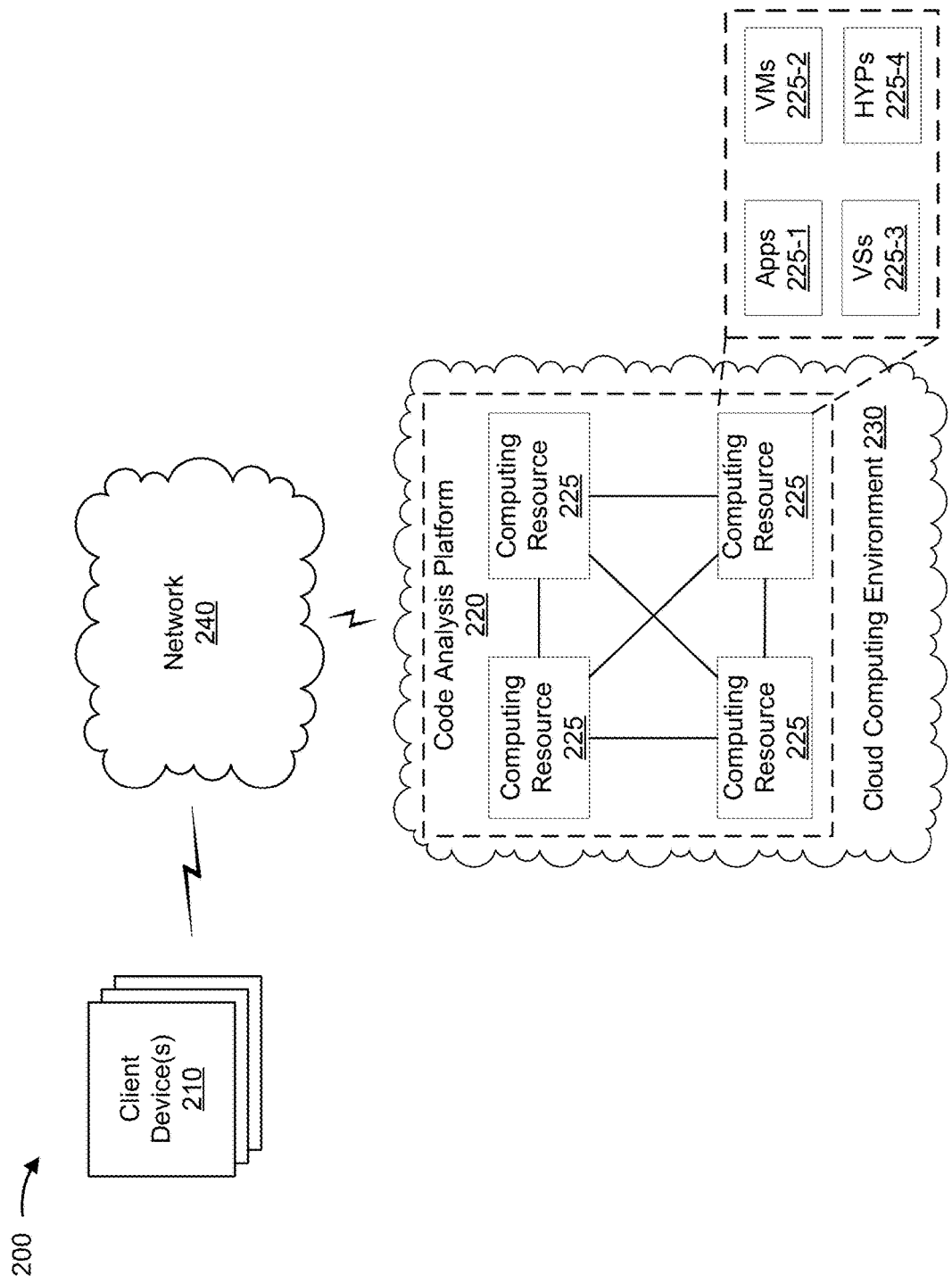
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client device(s) 210, a code analysis platform 220, a cloud computing environment 230, and a network 240. Devices of environment 200 may interconnect via wired connections, wireless connections, or a combination of wired and wireless connections.

Client device 210 includes one or more devices capable of receiving, generating, storing, processing, and/or providing information associated with a development project. For example, client device 210 may include a communication and/or computing device, such as a mobile phone (e.g., a smart phone, a radiotelephone, etc.), a computer (e.g., a desktop computer, a laptop computer, a tablet computer, a handheld computer, etc.), a gaming device, a wearable communication device (e.g., a smart wristwatch, a pair of smart eyeglasses, etc.), or a similar type of device. In some implementations, client device 210 may provide, via a user interface, a report relating to a development project, such as a compliance report relating to program code compliance with a set of requirements, a vulnerability report relating to a set of program code vulnerabilities, a developer report relating to developer performance, or the like. In some implementations, client device 210 may provide, via a user interface, a set of recommendations relating to improving a development project, such as program code improvements, developer productivity improvements, or the like. In some implementations, client device 210 corresponds to client device 110 shown in FIGS. 1A and 1B.

Code analysis platform 220 includes one or more devices capable of receiving, generating, storing, processing, and/or providing information associated with a development project, as described elsewhere herein. For example, code analysis platform 220 may include a cloud server or a group of cloud servers. In some implementations, code analysis platform 220 may be designed to be modular such that certain software modules can be swapped in or out depending on a particular need. As such, code analysis platform 220 may be easily and/or quickly reconfigured for different uses. In some implementations, as shown, code analysis platform 220 may be hosted in cloud computing environment 230. Notably, while implementations described herein describe code analysis platform 220 as being hosted in cloud computing environment 230, in some implementations, code analysis platform 220 may not be cloud-based (i.e., may be implemented outside of a cloud computing environment) or may be partially cloud-based. In some implementations, code analysis platform 220 corresponds to code analysis platform 120 shown in FIGS. 1A and 1B.

Cloud computing environment 230 includes an environment that hosts code analysis platform 220. Cloud computing environment 230 may provide computation, software, data access, storage, etc. services that do not require end-user (e.g., client device 210) knowledge of a physical location and configuration of system(s) and/or device(s) that hosts code analysis platform 220. As shown, cloud computing environment 230 may include a group of computing resources 225 (referred to collectively as "computing resources 225" and individually as "computing resource 225").

Computing resource 225 includes one or more personal computers, workstation computers, server devices, or another type of computation and/or communication device. In some implementations, computing resource 225 may host code analysis platform 220. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2A, computing resource 225 includes a group of cloud resources, such as one or more applications ("APPs") 225-1, one or more virtual machines ("VMs") 225-2, one or more virtualized storages ("VSs") 225-3, and/or one or more hypervisors ("HYPs") 225-4.

Application 225-1 includes one or more software applications that may be provided to or accessed by client device 210. Application 225-1 may eliminate a need to install and execute the software applications on client device 210. For example, application 225-1 may include software associated with code analysis platform 220 and/or any other software capable of being provided via cloud computing environment 230. In some implementations, one application 225-1 may send/receive information to/from one or more other applications 225-1, via virtual machine 225-2. In some implementations, a vulnerability check may be performed on an application 225, a set of applications 225, a system operating applications 225, or the like to test an application 225. In some implementations, applications 225-1 may include a set of applications associated with analyzing program code, such as testing execution of portions of program code, identifying vulnerabilities of portions of program code, or the like. In some implementations, applications 225-1 may include a set of applications associated with monitoring a development project, such as an application to monitor authoring of program code by a developer, an application to monitor milestone progress by a team of developers, or the like. In some implementations, applications 225-1 may include a set of scripts executed to perform a project assessment of program code of a development project.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of a user (e.g., client device 210), and may manage infrastructure of cloud computing environment 230, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations. In some implementations, data may be stored in a structured or unstructured format, and processing may be applied to convert between a structured and unstructured format for utilization in computations. Unstructured data may include log data from monitoring of project management tools, social media data sources, or the like (e.g., quantitative data, qualitative data, etc. regarding a project, a set of employees, or the like).

Hypervisor 225-4 may provide hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
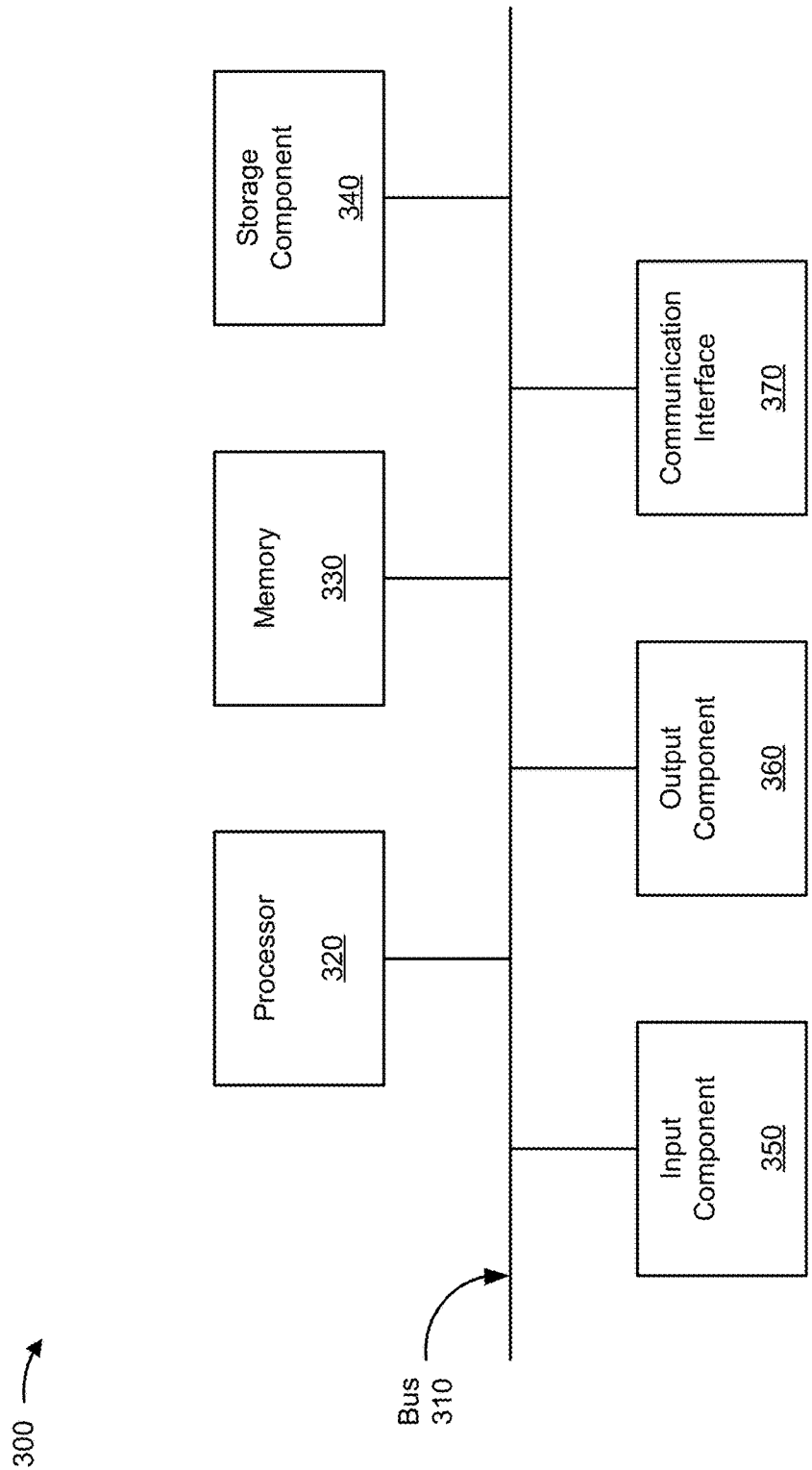
FIG. 3 is a diagram of example components of one or more devices of FIG. 2.

FIG. 3 is a diagram of example components of a device 300. Device 300 may correspond to client device 210, code analysis platform 220, and/or cloud computing environment 230. In some implementations, client device 210, code analysis platform 220, and/or cloud computing environment 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
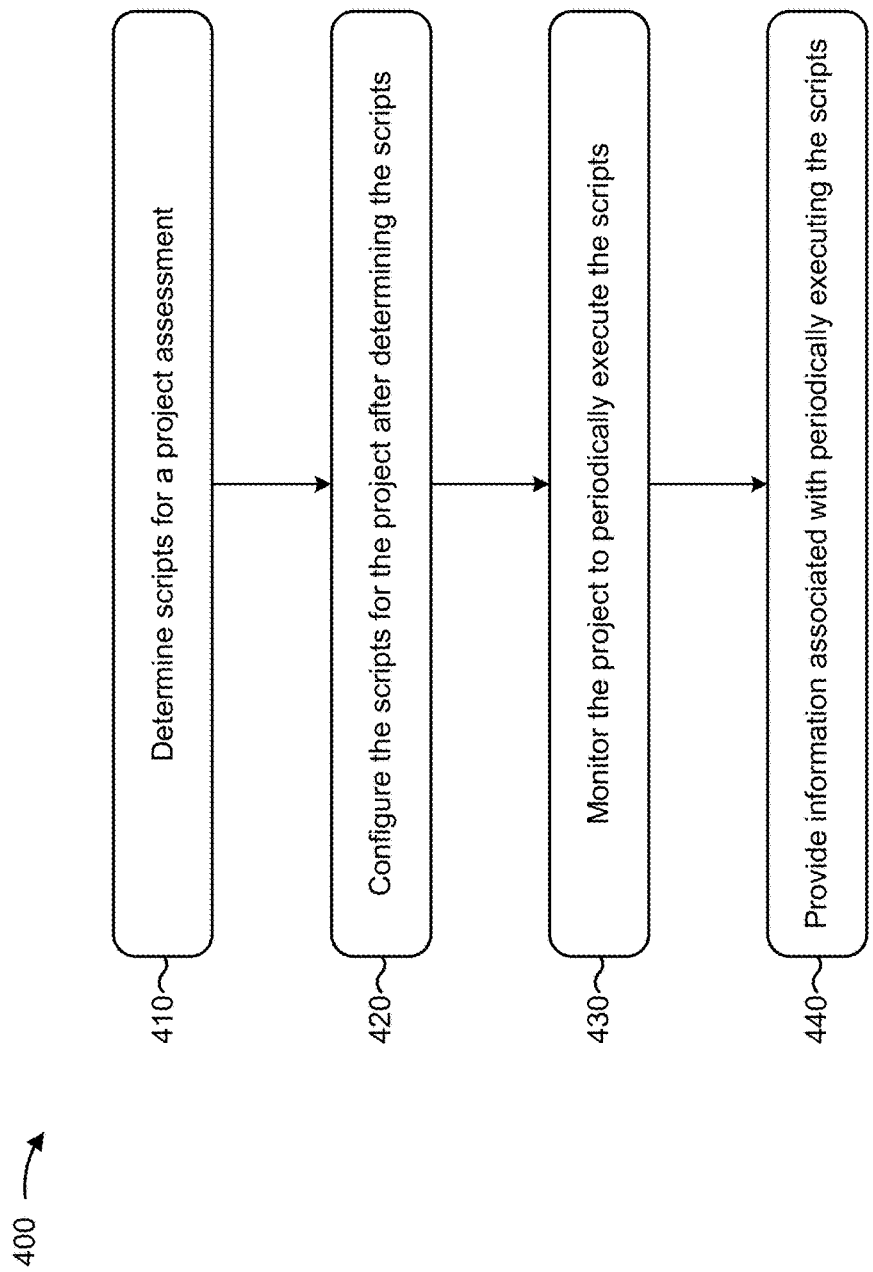
FIG. 4 is a flow chart of an example process for automatically performing program code assessment and reporting.

FIG. 4 is a flow chart of an example process 400 for automatically performing program code assessment and reporting. In some implementations, one or more process blocks of FIG. 4 may be performed by code analysis platform 220. In some implementations, one or more process blocks of FIG. 4 may be performed by another device or a group of devices separate from or including code analysis platform 220, such as client device 210 or the like.

As shown in FIG. 4, process 400 may include determining scripts for a project assessment (block 410). For example, code analysis platform 220 may determine scripts for the project assessment. In some implementations, code analysis platform 220 may determine the scripts for the project assessment based on scripts stored in a script repository. For example, code analysis platform 220 may store scripts generated for portions of program code, such as portions of open source program code, portions of non-open source program code, portions of program code relating to authentication, portions of program code relating to performing a particular function, portions of program code relating to report generation, or the like, and may obtain the stored scripts to test the portions of program code when incorporated into a subsequent development project. In some implementations, a script may include a test script (e.g., for testing program code).

In some implementations, code analysis platform 220 may determine the scripts for the project assessment based on an initial assessment (e.g., a program code analysis). For example, code analysis platform 220 may parse program code of a development project to identify a portion of the program code that is similar to another portion of program code of another development project for which a script has been used. Additionally, or alternatively, code analysis platform 220 may utilize a particular analysis technique, such as a pattern recognition technique, a machine learning technique, an artificial intelligence technique, a natural language processing technique, or the like, to generate a score representing a similarity of the portion of program code to the other portion of program code (e.g., a similarity in functionality, syntax, authorship, etc.). Based on the score satisfying a threshold, code analysis platform 220 may select a script associated with testing the other portion of program code for testing the portion of program code.

In some implementations, code analysis platform 220 may select one or more scripts based on project information, such as a type of the project, a client of the project, a characteristic of the client (e.g., a size of the client, an industry of the client, a list on which the client appears, etc.), or the like. For example, when the development project relates to a client that has previously included a requirement that a particular variable be defined as a particular type, code analysis platform 220 may select a script associated with checking a type of each variable when code analysis platform 220 is to perform an assessment of the development project for the client. In this way, code analysis platform 220 may utilize a script to perform an execution based project assessment to identify an execution type of error in execution of the program code (e.g., undefined variables, syntactical errors, variable type errors, etc.).

In some implementations, code analysis platform 220 may select the one or more scripts based on a set of requirements relating to the project. For example, based on a requirements document indicating that each portion of program code is to include documentation identifying a functionality, code analysis platform 220 may select a script associated with parsing the program code to identify documentation in the program code. In this way, code analysis platform 220 may perform improved project assessment by performing a non-execution based project assessment that is to assess for a non-execution type of error in a development project relative to other techniques for testing that perform execution testing.

In some implementations, code analysis platform 220 may provide a user interface to receive information associated with selecting one or more scripts for use in performing a project assessment. For example, code analysis platform 220 may receive information identifying a particular operating system associated with the development project, and may select one or more scripts associated with the operating system or customize one or more customizable scripts to be utilized for the operating system, such as by altering a set of dependencies, a script file type, a functionality, or the like. Additionally, or alternatively, code analysis platform 220 may receive information identifying an application server associated with the development project, and may monitor the application server to perform real time project assessment, to monitor developer productivity in developing program code, or the like.

In some implementations, code analysis platform 220 may obtain information identifying a set of code quality parameters to analyze when performing the project assessment using the set of scripts. For example, code analysis platform 220 may obtain a set of coding standards identifying documentation, formatting, style, etc. associated with program code that is to be determined when using the set of scripts, a set of accessibility standards relating to ensuring that the development project satisfies a set of accessibility requirements, or the like. In some implementations, code analysis platform 220 may perform a natural language analysis of a document to generate a script. For example, code analysis platform 220 may determine a regulation relating to accessibility of a government website, data security, open data availability, or the like and may parse the regulation to determine a set of requirements that satisfy the regulation. In this case, based on the set of requirements, code analysis platform 220 may generate a script associated with ensuring that portions of the program code of the development project satisfy the set of requirements.

In this way, code analysis platform 220 determines scripts for a project assessment.

As further shown in FIG. 4, process 400 may include configuring the scripts for the project after determining the scripts (block 420). For example, code analysis platform 220 may configure the scripts for the project. In some implementations, code analysis platform 220 may configure the scripts for a particular operating system associated with the development project. For example, code analysis platform 220 may configure a set of dependencies associated with the scripts to enable the scripts to be executed on an application server associated with the development project. In some implementations, code analysis platform 220 may configure a set of rollback and/or backup policies associated with the scripts. For example, code analysis platform 220 may configure a set of threshold criteria relating to a result of executing a script. In this case, based on executing a script and determining that a threshold score associated with the script is not satisfied, code analysis platform 220 may automatically roll back revisions to the program code, thereby reducing a utilization of computing resources associated with attempting to revise program code that has errors. In some implementations, code analysis platform 220 may configure a script by automatically generating code to fill a template portion of a script, inserting a set of program code dependencies into the script, selecting a response action for a decision criterion of a script (e.g., to control behavior of code analysis platform 220 when executing the script), and/or the like.

In some implementations, code analysis platform 220 may generate an artifact based on the scripts. For example, code analysis platform 220 may configure the scripts as a test suite and/or an executable for use in executing the scripts on program code of the development project. In this case, code analysis platform 220 may communicate with client device 210 to provide the artifact to client device 210 for execution on client device 210. In some implementations, code analysis platform 220 may modify one or more of the scripts. For example, when a particular script is associated with testing for a particular type of variable usage and a change requirement is received that alters the type of variable usage, code analysis platform 220 may automatically alter the particular script to test for the altered type of variable usage. In this way, a utilization of computing resources is reduced relative to generating a new script based on a change requirement.

In this way, code analysis platform 220 configures the scripts for the project after determining the scripts.

As shown in FIG. 4, process 400 may include monitoring the project to periodically execute the scripts (block 430). For example, code analysis platform 220 may monitor the project to periodically execute the scripts after configuring the scripts. In some implementations, code analysis platform 220 may deploy the scripts to the development project. For example, code analysis platform 220 may provide a test suite to client device 210 for use by a developer in testing program code of the development project. Additionally, or alternatively, code analysis platform 220 may automatically cause the test suite to execute to test the program code.

In some implementations, code analysis platform 220 may communicate with client device 210 to monitor the development project. For example, code analysis platform 220 may transmit a set of requests to client device 210 and may receive a set of responses indicating a status of the development project, such as a quantity of lines of code generated, a quantity of test executions performed, or the like. In some implementations, code analysis platform 220 may monitor development of the development project, and may periodically execute the scripts based on monitoring development of the development project. For example, code analysis platform 220 may execute the scripts hourly, daily, weekly, or the like, which may result in thousands, millions, or billions of data points relating to the development project. In this case, code analysis platform 220 may utilize a set of big data techniques, such as machine learning, neural networking, heuristic algorithms, or the like to process data points relating to the development project and determine a status of the development project.

In some implementations, code analysis platform 220 may execute a script based on detecting a trigger. For example, based on a developer completing a portion of the program code (e.g., a line, a function, a method, etc.), code analysis platform 220 may cause a script to be executed to test the portion of the program code. Additionally, or alternatively, based on a threshold amount of program code being generated, code analysis platform 220 may cause a script to be executed to determine whether a milestone is achieved for the development project.

In some implementations, code analysis platform 220 may execute a particular subset of scripts for the development project. For example, code analysis platform 220 may execute a requirements script relating to a requirements document when the development project is to be submitted for client review. Similarly, code analysis platform 220 may execute a version control script to determine whether to update a version of an application based on the development project. Similarly, code analysis platform may execute an accessibility script based a new functionality being added to the development project to ensure that the new functionality complies with an accessibility standard.

In some implementations, code analysis platform 220 may store information relating to monitoring the development project. For example, code analysis platform 220 may store information relating to productivity by developers (e.g., lines of code authored, hours worked, etc.), information relating to progress of the development project (e.g., milestones achieved), information relating to quality of the development project (e.g., errors detected using the scripts), or the like.

In this way, code analysis platform 220 monitors the project to periodically execute the scripts.

As further shown in FIG. 4, process 400 may include providing information associated with periodically executing the scripts (block 440). For example, code analysis platform 220 may provide information associated with periodically executing the scripts. In some implementations, code analysis platform 220 may generate a user interface to provide information associated with periodically executing the scripts. For example, code analysis platform 220 may generate a user interface that includes a code quality assessment, a developer quality assessment, a code vulnerability assessment, a set of recommendations, or the like, and may provide the user interface for display via client device 210.

In some implementations, code analysis platform 220 may provide a result of executing the scripts for display via a user interface of client device 210. For example, code analysis platform 220 may communicate with client device 210 to cause results of executing the scripts to be provided for display. In some implementations, code analysis platform 220 may store a log of results of periodically executing the scripts. For example, code analysis platform 220 may store an error log identifying program code errors.

In some implementations, code analysis platform 220 may provide information identifying a work quality assessment of a set of developers. For example, code analysis platform 220 may generate a set of scores relating to a rate of errors, a quantity of lines of code generated, a quantity of lines of program code documentation generated, etc. for each developer, and may provide information identifying the set of scores for the set of developers. In some implementations, code analysis platform 220 may automatically assign subsequent work based on the work quality assessment of the set of developers. For example, code analysis platform 220 may determine that a subsequent portion of the development project or another development project is associated with a threshold difficulty level, and may select a developer associated with a threshold score for completing the subsequent portion of the development project. In this case, code analysis platform 220 may transmit a message to a client device 210 utilized by the developer, a manager, etc. to indicate the assignment of the developer to complete the subsequent portion of the development project.

In some implementations, code analysis platform 220 may provide information, such as a recommendation, associated with improving an accuracy or a speed of development of the development project. For example, code analysis platform 220 may identify an error based on executing the scripts on a first project that is similar to another error associated with a second project. In this case, code analysis platform 220 may obtain stored information relating to a set of practices or procedures instituted for the second project to remedy the error, and may provide the stored information for display via a user interface. In this way, code analysis platform 220 may reduce a quantity of errors in the development project and/or an amount of time to complete a development project relative to the practices or procedures to be implemented based on failing to identify the error (e.g., an execution type of error, a non-execution type of error, a combination of execution types of errors and non-execution types of errors, and/or the like).

In some implementations, code analysis platform 220 may automatically implement a recommendation. For example, based on determining that documentation of a program code functionality is not included for the program code functionality, code analysis platform 220 may identify a similar portion of program code from another development project, and may cause documentation from the other development project to be included in the development project. In this way, code analysis platform 220 may reduce a utilization of computing resources relative to generating new documentation for a portion of program code. Similarly, based on determining that program code from a particular developer does not satisfy a code quality score, code analysis platform 220 may automatically reassign a set of developers based on availabilities, a set of developer competencies, or the like to ensure that the development project is not delayed.

In some implementations, code analysis platform 220 may provide information associated with a set of milestones of the development project. For example, based on executing the scripts, code analysis platform 220 may determine that a particular milestone is satisfied, and may communicate with a client device 210 operated by a client commissioning the development project to indicate that the particular milestone is satisfied. In this case, code analysis platform 220 may transmit an instruction to initiate payment relating to completion of the particular milestone, thereby reducing an amount of network traffic relative to managers for the development project and the client exchanging multiple messages to confirm the milestone and initiate payment.

In some implementations, code analysis platform 220 may provide a certification relating to the development project. For example, based on executing a script relating to testing satisfaction of accessibility requirements (e.g., text-to-speech functionalities for deaf users of a website), code analysis platform 220 may automatically generate a compliance report indicating that the accessibility requirements are satisfied. In this case, code analysis platform 220 may submit the compliance report to, for example, a government agency commissioning the development project, to cause the government agency to determine that the development project is completed.

In some implementations, code analysis platform 220 may automatically update a website or application based on executing the scripts. For example, based on determining that the development project passes a threshold quantity of the scripts (e.g., some of the scripts, all of the scripts, etc.) relating to code quality and code vulnerability, code analysis platform 220 may update a website based on the development project, cause an updated application to be downloaded by a set of client devices 210, or the like. In this way, code analysis platform 220 reduces a likelihood that client devices 210 waste computing resources using out of date, error prone, and/or vulnerable applications or websites.

In this way, code analysis platform 220 provides information associated with periodically executing the scripts.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, code analysis platform 220 automatically generates reports relating to satisfaction of requirements for development projects, thereby reducing an amount of time to certify completion of a development project relative to performing manual code analysis. Based on reducing time to certify completion, code analysis platform 220 permits updating of websites and applications in a reduced time, thereby reducing security vulnerabilities from previous versions, utilization of computing resources from error filled previous versions, or the like. Moreover, based on proactively monitoring the development project to periodically execute the scripts and processing results of executing the scripts using big data techniques, code analysis platform 220 improves a likelihood that an error is caught relatively early in the development process, thereby reducing an amount of time and utilization of computing resources to resolve the error relative to the error being detected later in the development process.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a memory; and
   one or more processors to:
      receive information identifying a development project;
      process the information identifying the development project to determine a set of scripts to assess program code of the development project,
         the set of scripts including a first script to detect an execution type of error,
         the set of scripts including a second script to detect a non-execution type of error;
      configure the set of scripts after determining the set of scripts;
      generate an artifact that includes one or more scripts of the set of scripts;
      communicate with a client device to monitor the development project and to periodically execute the artifact to perform a project assessment of the development project;
      receive, from the client device, information identifying results of the project assessment based on communicating with the client device to monitor the development project and to periodically execute the artifact,
         the results including information associated with detecting the execution type of error or information associated with detecting the non-execution type of error; and
      provide the information identifying the results.

2. The device of claim 1, where the one or more processors are further to:
   execute a script, of the set of scripts, to determine whether a set of accessibility standards is satisfied by the development project; and
   communicate with the client device to provide an indication of whether the set of accessibility standards is satisfied by the development project.

3. The device of claim 1, where the one or more processors, when configuring the set of scripts, are to:
   modify a script, of the set of scripts, based on the development project.

4. The device of claim 1, where the one or more processors, when determining the set of scripts, are to:
   identify another development project;
   determine one or more scripts associated with the other development project; and
   select the one or more scripts associated with the other development project for the development project.

5. The device of claim 1, where the one or more processors, when communicating with the client device to monitor the development project and to periodically execute the artifact, are to:
   provide, to the client device for execution, a test suite including the artifact.

6. The device of claim 1, where the one or more processors, when providing the information identifying the results, are to:
   provide information identifying a certification relating to one or more requirements for the development project.

7. The device of claim 1, where the one or more processors, when providing the information identifying the results, are to:
   provide information identifying a quality score associated with a set of developers working on the development project.

8. A method carried out with execution of memory-stored instructions coupled to a corresponding processor of one or more processing devices, comprising:

determining, by a processing device, a set of scripts for a project assessment of program code of a development project;
configuring, by the processing device, the set of scripts for execution to perform the project assessment of the program code of the development project based on determining the set of scripts,
the set of scripts including:
a first script to detect an execution type of error, and
a second script to detect a non-execution type of error;
generating, by the processing device, an artifact that includes one or more scripts of the set of scripts;
monitoring, by the processing device, the development project;
determining, by the processing device, to execute the one or more scripts to perform the project assessment of the program code of the development project based on monitoring the development project;
communicating, by the processing device, with another device to monitor the development project and to periodically execute the artifact that includes the one or more scripts to perform the project assessment of the program code of the development project;
receiving, by the processing device and from the other device, information identifying a set of results of the project assessment of the program code of the development project based on the other device executing the artifact that includes the one or more scripts;
generating, by the processing device, a set of recommendations relating to the development project based on the set of results of the project assessment of the program code of the development project; and
providing, by the processing device, information associated with the set of recommendations after generating the set of recommendations,
the information, associated with the set of recommendations, identifying a project assessment result including information associated with detecting an execution type of error or information associated with detecting a non-execution type of error.

9. The method of claim 8, where providing the information associated with the set of recommendations comprises:
providing, to the other device, the information associated with the set of recommendations to cause the set of recommendations to be implemented for the development project.

10. The method of claim 8, where generating the set of recommendations comprises:
generating a recommendation relating to at least one of:
program code quality,
data security,
data retention,
data protection and risk coverage,
program code documentation,
development project accessibility, or
a task assignment for a developer of the development project.

11. The method of claim 8, further comprising:
performing an initial assessment of the program code of the development project to identify an open source portion of the program code of the development project;
determining a stored script relating to testing the open source portion; and
including the stored script in the set of scripts to test the open source portion.

12. The method of claim 8, further comprising:
performing an initial assessment of the program code of the development project to identify a portion of the program code of the development project that is used in another development project,
the other development project being associated with a stored script to test the portion of the program code of the development project; and
including the stored script in the set of scripts to test the portion of the program code of the development project.

13. The method of claim 8, further comprising:
determining a portion of program code of another development project corresponding to a portion of the program code of the development project;
determining documentation for the portion of the program code of the other development project; and
including the documentation for the portion of the program code of the other development project in the development project to document the portion of the program code of the development project; and
where providing the information associated with the set of recommendations comprises:
providing the information associated with the set of recommendations based on including the documentation for the portion of the program code of the other development project in the development project.

14. A non-transitory computer-readable medium storing instructions, the instructions comprising:
one or more instructions that, when executed by one or more processors, cause the one or more processors to:
receive information identifying a development project;
configure a set of scripts to assess program code of the development project,
the set of scripts including:
a first script to detect an execution type of error;
a second script to detect a non-execution type of error;
generate an artifact that includes one or more scripts of the set of scripts;
determine to execute the one or more scripts to perform a project assessment of the development project;
communicate with a client device to monitor the development project and to periodically execute the artifact that includes the one or more scripts to perform the project assessment of the development project;
receive, from the client device, information identifying a result of the project assessment of the development project based on the client device executing the artifact that includes the one or more scripts;
generate a user interface including the information identifying the result of the project assessment of the development project,
the result of the project assessment of the development project including information associated with detecting an execution type of error or information associated with detecting a non-execution type of error; and
communicate with the client device to provide the user interface for displaying the result of the project assessment of the development project via the client device.

15. The non-transitory computer-readable medium of claim 14, where the one or more instructions, when executed by the one or more processors, further cause the one or more processors to:

determine, based on the information associated with detecting the non-execution type of error, whether a set of accessibility standards is satisfied by the development project; and where the one or more instructions, that cause the one or more processors to generate the user interface, cause the one or more processors to:
include, in the user interface, an indication of whether the set of accessibility standards is satisfied by the development project.

16. The non-transitory computer-readable medium of claim 14, where the one or more instructions, when executed by the one or more processors, further cause the one or more processors to:
modify a script, of the set of scripts, to configure the script based on the development project.

17. The non-transitory computer-readable medium of claim 14, where the one or more instructions, that cause the one or more processors, further cause the one or more processors to:
identify another development project similar to the development project;
determine one or more scripts associated with the other development project; and
select the one or more scripts associated with the other development project for the development project; and
where the one or more instructions, that cause the one or more processors to configure the set of scripts, cause the one or more processors to:
configure the one or more scripts associated with the other development project.

18. The non-transitory computer-readable medium of claim 14, where the one or more instructions, when executed by the one or more processors, further cause the one or more processors to:
generate a test suite that includes the one or more scripts;
provide the test suite to the client device; and
cause the client device to execute the test suite to execute the one or more scripts.

19. The non-transitory computer-readable medium of claim 14, where the one or more instructions, when executed by the one or more processors, further cause the one or more processors to:
process, using a machine learning technique, first data relating to the result of the project assessment of the development project and second data relating to results of executing other sets of scripts on other development projects;
determine, based on processing the first data and the second data, a set of recommendations relating to the development project; and
where the one or more instructions, that cause the one or more processors to generate the user interface, cause the one or more processors to:
include the set of recommendations in the user interface.

20. The non-transitory computer-readable medium of claim 14, where the non-execution type of error includes an error associated with an accessibility requirement for text-to-speech functionality.

* * * * *

UNITED STATES PATENT AND TRADEMARK OFFICE
CERTIFICATE OF CORRECTION

PATENT NO. : 10,606,739 B2
APPLICATION NO. : 15/913630
DATED : March 31, 2020
INVENTOR(S) : Hemant Kakkad et al.

Page 1 of 1

It is certified that error appears in the above-identified patent and that said Letters Patent is hereby corrected as shown below:

In the Claims

Claim 14:
Column 18, Lines 36, change "the set of scripts including;" should be changed to - the set of scripts including: -
Column 18, Line 37, change "a first script to detect an execution type of error;" should be changed to - a first script to detect an execution type of error, and -

Signed and Sealed this
Twenty-fourth Day of November, 2020

Andrei Iancu
*Director of the United States Patent and Trademark Office*